US010146761B2

United States Patent
Ben-Tzur

(10) Patent No.: US 10,146,761 B2
(45) Date of Patent: Dec. 4, 2018

(54) TEMPLATES FOR APPLICATION CARDS

(71) Applicant: Samsung Electronics Co., Ltd., Suwon-si, Gyeonggi-do (KR)

(72) Inventor: Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 14/875,226

(22) Filed: Oct. 5, 2015

(65) Prior Publication Data

US 2017/0097926 A1     Apr. 6, 2017

(51) Int. Cl.
*G06F 17/21*   (2006.01)
*G06F 17/24*   (2006.01)
*H04L 29/08*   (2006.01)
*G06F 17/22*   (2006.01)
*G06F 17/27*   (2006.01)

(52) U.S. Cl.
CPC .......... *G06F 17/248* (2013.01); *G06F 17/212* (2013.01); *G06F 17/214* (2013.01); *G06F 17/2247* (2013.01); *G06F 17/2288* (2013.01); *G06F 17/272* (2013.01); *H04L 67/02* (2013.01)

(58) Field of Classification Search
CPC .. G06F 17/212; G06F 17/248; G06F 17/3005; G06F 17/30554; G06F 17/30696; G06F 17/30941; G06F 17/30991
See application file for complete search history.

(56) References Cited

U.S. PATENT DOCUMENTS

| | | | |
|---|---|---|---|
| 8,090,719 B2 * | 1/2012 | Wade ................ | G06F 17/30905 707/706 |
| 9,274,683 B2 * | 3/2016 | Fey ........................ | G06F 3/0484 |
| 9,684,735 B2 * | 6/2017 | Gao .................. | G06F 17/30905 |
| 9,691,086 B1 * | 6/2017 | Deodhar ................ | G06F 17/21 |
| 9,781,202 B2 * | 10/2017 | Ismalon ............ | H04L 67/1095 |
| 2010/0114874 A1 * | 5/2010 | Hansson ........... | G06F 17/30991 707/722 |
| 2012/0066634 A1 * | 3/2012 | Kim .................. | G06F 17/30867 715/777 |

(Continued)

OTHER PUBLICATIONS

Foldoc, "inverted index," Feb. 8, 1995, Available http://foldoc.org/inverted+index.*

*Primary Examiner* — Alvin H Tan

(74) *Attorney, Agent, or Firm* — Jefferson IP Law, LLP

(57) ABSTRACT

A server includes a template data store that stores card templates for application cards and a processing device configured to: receive a card request having information that indicates an application and a particular state of the application; identify the application and the particular state of the application indicated in the request; query the template data store for card templates that correspond with the application and the particular state of the application indicated in the request; in response to the query, receive a card template that corresponds with the particular state of the application indicated in the request; determine a color scheme associated with the application indicated in the request; apply the color scheme associated with the application to the card template; generate a data container that represents a card object, the card object including information regarding the card template; and transmit the card object via the network communication device.

20 Claims, 5 Drawing Sheets

(56) References Cited

U.S. PATENT DOCUMENTS

| | | | | |
|---|---|---|---|---|
| 2013/0007587 A1* | 1/2013 | Marantz | ............ | G06F 17/30896 |
| | | | | 715/234 |
| 2014/0250106 A1* | 9/2014 | Shapira | ............. | G06F 17/30864 |
| | | | | 707/722 |
| 2015/0317945 A1* | 11/2015 | Andress | ................ | G06T 11/001 |
| | | | | 345/590 |
| 2016/0092402 A1* | 3/2016 | Martin | ................ | G06F 3/04847 |
| | | | | 715/752 |
| 2016/0162583 A1* | 6/2016 | Maddocks | ........ | G06F 17/30867 |
| | | | | 707/722 |

* cited by examiner

TEMPLATES FOR APPLICATION CARDS

TECHNICAL FIELD

This disclosure relates to card templates for application cards.

BACKGROUND

Some mobile computing devices display application cards that correspond with applications. The application cards may correspond with applications that are installed on the mobile computing device (i.e., native applications). Alternatively, the application cards may correspond with applications that are hosted on the web (e.g., web applications, for example, web pages). The application cards display information that is typically displayed by their corresponding application. Most application cards are created manually. Furthermore, most application cards are application-specific. Hence, creating application cards can be a laborious activity. Due to the amount of work involved in creating an application card, many applications do not have corresponding application cards. Therefore, there is a need to efficiently generate application cards for applications.

SUMMARY

One aspect of the disclosure provides a server that includes a network communication device, a storage device and a processing device. The storage device may be configured to store a template data store that stores card templates for application cards. Each card template may be associated with one or more states of one or more applications. Each card template may include one or more data fields and at least one layout that indicates relative positions of the data fields in the application card. The processing device executes computer-readable instructions that, when executed by the processing device, cause the processing device to receive a card request. The card request includes information that indicates an application and a particular state of the application. The processing device identifies the application and the particular state of the application indicated in the request. The processing device queries the template data store for card templates that correspond with the application and the particular state of the application indicated in the request. In response to the query, the processing device receives a card template that corresponds with the particular state of the application indicated in the request. The processing device determines a color scheme associated with the application indicated in the request. The processing device applies the color scheme associated with the application to the card template. The processing device generates a data container that represents a card object. The card object includes information regarding the card template. The server transmits the card object via the network communication device.

Implementations of the disclosure may include one or more of the following optional features. In some implementations, the application includes a native application that can be installed on a mobile computing device. The information in the card request may include a state access mechanism, the state access mechanism including a string that refers to the native application and the particular state of the native application.

In some examples, identifying the application includes parsing the string to identify an application ID that identifies the native application and identifying the particular state of the application includes parsing the string to identify a state ID that identifies the particular state. Querying the template data store may include querying an inverted index with a state ID that identifies the particular state of the application. The inverted index maps state IDs to template IDs that correspond with the card templates stored in the template data store. Receiving the card template may include receiving a template ID that identifies the card template and retrieving the card template from the template data store.

In some examples, determining the color scheme associated with the application includes determining a color that the application uses most frequently. Applying the color scheme to the card template may include changing a background color of the card template to a color that the application uses most frequently. Generating the data container may include writing information regarding the data fields of the card template and the layout of the data fields.

Another aspect of the disclosure provides a server that includes a network communication device, a storage device and a processing device. The storage device may be configured to store a template data store that stores card templates for application cards. Each card template may be associated with one or more web uniform resource locators (URLs). Each card template may include one or more data fields and at least one layout that indicates relative positions of the data fields in the application card. The processing device executes computer-readable instructions that, when executed by the processing device, cause the processing device to receive a request for a card template. The request includes a web access mechanism that provides access to a web application. The processing device identifies a web URL based on the web access mechanism. The processing device utilizes the web URL to query the template data store for card templates that correspond with the web application indicated in the request. In response to the query, the processing device receives a card template that corresponds with the web application indicated in the request. The processing device determines a font scheme associated with the web application indicated in the request. The processing device applies the font scheme associated with the web application to the card template and transmits the card template via the network communication device.

Implementations of the disclosure may include one or more of the following optional features. In some implementations, querying the template data store includes querying an inverted index with the web URL specified in the request. The inverted index indexes web URLs to template IDs that identify the card templates stored in the template data store. Receiving the card template may include receiving a template ID that identifies the card template and retrieving the card template from the template data store. Determining the font scheme associated with the web application may include determining a font that the web application uses most frequently to display information. Applying the font scheme to the card template may include associating the font with the data fields of the card template. Transmitting the card template may include instantiating a data container that represents a card object and writing information regarding the data fields of the card template and the layout of the data fields.

Another aspect of the disclosure provides a computer-implemented method that includes storing, at a storage device, a template data store that stores card templates for application cards. Each card template includes a template identifier (ID) that identifies the card template, one or more data fields and at least one layout. Each data field may include a field ID that identifies the data field. The at least one layout may indicate relative positions of the data fields in the application card. The method may include receiving, via a network communication device, a request for a card template. The request may include field IDs. The method may include querying, by a processing device, the template data store for card templates that correspond with the field IDs specified in the request. The method may include receiving, at the processing device, a card template that corresponds with the field IDs specified in the request. The method may include instantiating, at the processing device, a data container that represents a card object. The method may include writing, by the processing device, information regarding the data fields and the layout of the template to the card object. The method may include transmitting the card object via the network communication device.

Implementations of the disclosure may include one or more of the following optional features. In some implementations, querying the template data store includes querying an inverted index with the field IDs specified in the request. The inverted index indexes field IDs to the template IDs of the card templates stores in the template data store. Receiving the card template may include: receiving a template ID the identifies the card template corresponding with the field IDs specified in the request; and retrieving the card template from the template data store. The request may indicate an application ID that identifies a native application. The method further includes modifying the card template based on the application ID specified in the request. Modifying the card template may include: determining a font scheme associated with the native application; and applying the font scheme to the card template. The card template may include a plurality of layouts, where each layout is associated with different application IDs. Modifying the card template may include: querying an inverted index with the application ID specified in the request. The inverted index indexes the application IDs to layout IDs that identify different layouts of the card template; in response to the query, receiving a layout ID that identifies a layout corresponding with the application ID specified in the request; and retrieving the layout identified by the layout ID.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
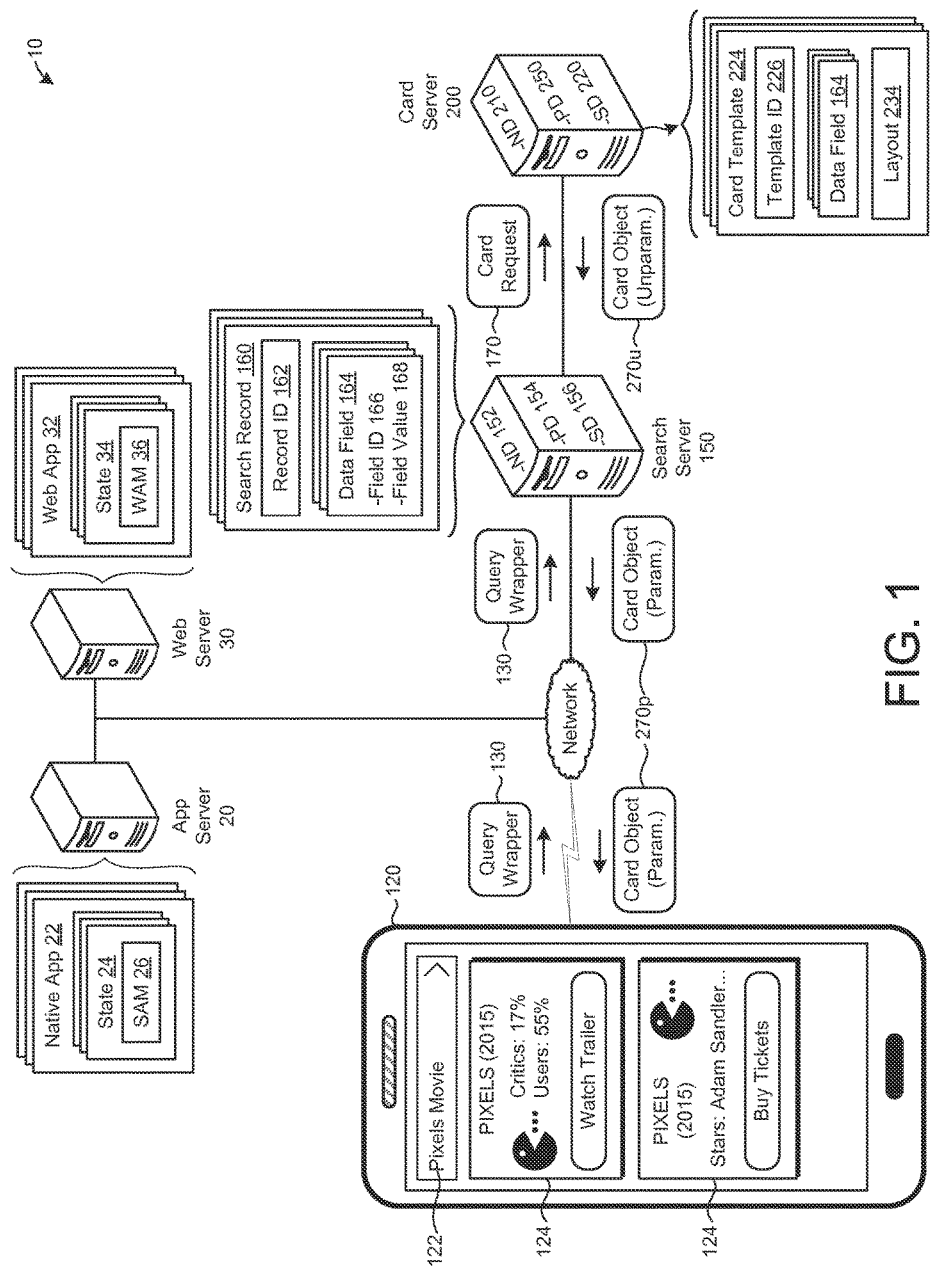
FIG. 1 is a schematic diagram of a system that determines card templates for application cards.

Some mobile computing devices display application cards. The application cards may correspond with particular states of particular applications. For example, an application card may correspond with a particular state of an application that is installed on the mobile computing device (i.e., a native application). Alternatively, an application card may correspond with a particular state of an application that is hosted on the web (i.e., a web application, for example, a webpage). The application cards can display information that is typically displayed by their corresponding application. Furthermore, an application card can include actionable graphical user interface (GUI) elements (e.g., buttons) that enable a user to perform a task that the corresponding application performs. Moreover, an application card may be linked to its corresponding application, so that a user selection of the application card launches the corresponding application. Currently, most application cards are application-specific. In other words, each application card is designed specifically for a particular application. Moreover, many application cards are created manually. Given the exponential growth in the number of applications, creating application cards for all applications manually is a monumental endeavor that consumes extensive resources. Therefore, there is a need to provide application cards more efficiently.

The present disclosure provides a card server that includes a template data store that stores card templates for application cards. In operation, the card server receives a card request. The card request can indicate various data fields that ought to be displayed on a mobile computing device in response to a search query initiated at the mobile computing device. The card server can determine which of the card templates stored in the template data store is suitable for displaying the data fields indicated in the request. If the card server received the request from a search server, the card server can send the selected card template to the search server in a data container that represents an unparameterized card object. The search server can parameterize (e.g., populate) the card object and send the parameterized card object to the mobile computing device. The mobile computing device can use the parameterized card object to display an application card. If the request also includes field values for the data fields, the card server can parameterize (e.g., populate) the card template based on the field values. Upon parameterizing the card template, the card server can send the parameterized template directly to the mobile computing device that generated the search query. In other words, the mobile computing device may receive the parameterized card object directly from the card server instead of the search server.

In some implementations, the request indicates a particular state of an application instead of, or in addition to, indicating the data fields that ought to be displayed on the mobile computing device. The card server may identify a card template that is associated with the state specified in the request. For example, the card server may utilize an inverted index that maps application IDs or state IDs to template IDs of the card templates. In some implementations, the application specified in the request is a native application. In some implementations, the application specified in the request is a web application (e.g., a webpage). The card server may identify a card template that is associated with the webpage indicated in the request. For example, the template server may utilize an inverted index that maps web URLs to template IDs of the templates. The card server may use various other techniques to determine the card template. For example, the card server can identify schema tags within the HTML code of a web application and select a card template that includes data fields corresponding with the identified schema tags.

FIG. 1 illustrates an example system 10 that can determine card templates for application cards. The system 10 may include an application server 20, a web server 30, a mobile computing device 120, a search server 150 and a card server 200. In general, the mobile computing device 120 sends a search query to the search server 150. The search server 150 determines search results in response to receiving the search query. The search server 150 requests the card server 200 for a card template that can be used to display the search results in the form of an application card. The card server 200 provides the search server 150 with an unparameterized card object that includes information regarding a card template that is suitable for displaying the search results. The search server 150 parameterizes (e.g., populates) the card object and sends the parameterized card object to the mobile computing device 120. The mobile computing device 120 uses the parameterized card object to display an application card.

The application server 20 stores information about native applications 22. A native application 22 may refer to an application that can be installed on the mobile computing device 120. A native application 22 may include various states 24. Each state 24 may be associated with a state access mechanism (SAM) 26. The SAM 26 can be used to access the state 24. The SAM 26 may include a string that refers to the state 24 and provides access thereto. For example, the SAM 26 may include a state identifier (ID) that identifies the state 24. The state ID may be referred to as an application resource identifier (ARI). The SAM 26 may include a uniform resource locator (URL) that can be used to access the state 24. Alternatively, the SAM 26 may include a script that the mobile computing device 120 can execute to access the state 24. The application server 20 may receive data requests (e.g., via application programming interface (API) calls) from the native applications 22 that are executing on the mobile computing device 120. In response to the data requests, the application server 20 can provide data to the native applications 22 executing on the mobile computing device 120. In some scenarios, the application server 20 may be a digital distribution platform that allows the mobile computing device 120 to download the native applications 22.

The web server 30 stores information regarding web applications 32. A web application 32 may refer to an application that the mobile computing device 120 can access via a network (e.g., a public network, such as the Internet). The web application 32 may refer to a webpage that the mobile computing device 120 can access via a web browser. A web application 32 may include various states 34. Each state 34 may be associated with a web access mechanism (WAM) 36. The WAM 36 can be used to access the state 34. The WAM 36 may include a string that refers to the state 34 and provides access thereto. For example, the WAM 36 may include a state identifier (ID) that identifies the state 34. The state ID may be referred to as a web resource identifier (WRI). The WAM 36 may include a web uniform resource locator (URL) that can be used to access the state 34. Alternatively, the WAM 36 may include a script that the mobile computing device 120 can execute to access the state 34. The web server 30 may receive data requests (e.g., API calls, HTTP requests, such as GET requests, etc.) from the mobile computing device 120. In response to the data requests, the web server 30 can provide data to the mobile computing device 120. In some scenarios, the web server 30 hosts the web applications 32.

The mobile computing device 120 can execute applications. The mobile computing device 120 can download, install and execute the native applications 22. The mobile computing device 120 can also execute the web applications 32 (e.g., via a web browser). The mobile computing device 120 can display a search box and receive a search query 122 via the search box. In response to receiving the search query 122, the mobile computing device 120 can display application cards 124. The application cards 124 may correspond with the native applications 22 or the web applications 32. In the example of FIG. 1, the application cards 124 relate to an example movie called 'PIXELS'. When a user of the mobile computing device 120 enters the search query 122 in the search box, the mobile computing device 120 can generate a query wrapper 130 and send the query wrapper 130 to the search server 150. The query wrapper 130 may also include contextual data that indicates a context of the mobile computing device 120 (e.g., sensor measurements, such as a location of the mobile computing device 120). In response to sending the query wrapper 130, the mobile computing device receives a parameterized card object 270$p$. The parameterized card object 270$p$ includes information that the mobile computing device 120 can use to display the application cards 124.

The search server 150 receives the query wrapper 130 and provides parameterized card objects 270$p$ in response to the query wrapper 130. The search server 150 may include a network communication device 152, a processing device 154 and a storage device 156. The network communication device 152 may include a transceiver that allows the search server 150 to communicate with the application server 20, the web server 30, the mobile computing device 120 and the card server 200. The processing device 154 may include one or more central processing units (CPUs) that can execute computer-readable instructions. The storage device 156 may include one or more computer readable storage mediums, such as solid state memory devices, hard disk memory devices, optical disk drives, read-only memory and/or nanotube-based storage devices.

The storage device 156 may store a search data store that stores search records 160 (records 160, hereinafter). The search data store may include one or more databases, indices (e.g., inverted indices), tables, Look-Up Tables (LUT), files and/or other data structures. The records 160 may be application records that store information about the native applications 22 and/or the web applications 32. The records 160 may be application state records that store information about particular states 24, 34 of the native applications 22 and/or the web applications 32. For example, a record 160 associated with a particular state 24 of a native application 22 may store the SAM 26 and any other information displayed by the state 24. Similarly, a record 160 associated with a state 34 of the web application 32 may store the WAM 36 and any other information displayed by the state 34. The search server 150 may generate the records 160 by crawling and scraping the application server 20 and/or the web server 30. Example techniques that the search server 150 can employ to generate the records 160 are disclosed in U.S. patent application Ser. No. 14/838,877 (TRANSMITTING CARD OBJECTS BASED ON CATEGORIZED AND SCRAPED DATA), the contents of which are incorporated by reference herein in its entirety.

The records 160 may include entity records that store information about different types of entities. For example, the records 160 may store information about person entities (e.g., athlete entities, actor entities, etc.), product entities, creative work entities (e.g., movie entities, song entities, etc.), place entities, etc. A record 160 may include a record ID 162 that identifies the record 160. A record 160 may also include various data fields 164. A data field 164 may include a field ID 166 that identifies the data field 164 and a field value 168 that stores information about the entity associated with the record 160. For example, if the record 160 is associated with a movie entity, the field values 168 may store a movie title, a movie poster, a movie release year, a critics rating, a user rating, a movie description, movie actors, a movie trailer, etc. Similarly, if the record 160 is associated with a person entity, the field values 168 may store an image of the person, a name of the person, biographical information of the person (e.g., birthdate, place of birth, name of parents, etc.) and a link to an online profile of the person.

Upon receiving the query wrapper 130, the search server 150 performs a search to identify a record 160 that includes information that is relevant to the search query 122 specified in the query wrapper 130. Performing the search may include scoring the records 160. The search server 150 may use various scoring features to score the records 160. The scoring features may be associated with the records 160 and/or the search query 122. In some examples, the search server 150 uses location as a scoring feature. The query wrapper 130 may include a location of the mobile computing device 120. Similarly, the records 160 may be associated with locations. The search server 150 can score a record 160 based on a distance between the location associated with the record 160 and the location specified in the query wrapper 130. The search server 150 can use any other suitable scoring features to score the records 160. In some implementations, the search server 150 is a machine-learned model to score the records 160. For example, a human operator can provide a sample search query along with human-curated scores for some of the records 160 as training data to a machine learner. The machine learner can use the training data to generate the machine learned model and use the machine learned model thereafter.

Upon identifying a relevant record 160, the search server 150 can send a card request 170 to the card server 200 in order to request a card template that the search server 150 can use to display information stored in the record 160. In some scenarios, the card request 170 may include the record ID 162 of the relevant record 160. Alternatively, the card request 170 may include the field IDs 166 of the relevant record 160. The card request 170 may also include the field values 168 of the relevant record 160. If the relevant record 160 is associated with a particular state 24 of the native application 22, the card request 170 may include the SAM 26. Similarly, if the relevant record 160 is associated with a particular state 34 web application 32, the card request 170 may include the WAM 36.

The card server 200 receives the card request 170 and provides an unparameterized card object 270u in response to the card request 170. The card server 200 may include a network communication device 210, a storage device 220 and a processing device 250. The network communication device 210 may include a transceiver that allows the card server 200 to communicate with the search server 150 and the mobile computing device 120. The storage device 220 may include one or more computer readable storage mediums, such as solid state memory devices, hard disk memory devices, optical disk drives, read-only memory and/or nanotube-based storage devices. The processing device 250 may include one or more central processing units (CPUs) that can execute computer-readable instructions.

The storage device 220 may store a template data store that stores card templates 224 (templates 224, hereinafter) for the application cards 124. A template 224 may include a template ID 226, the data fields 164 and a layout 234 that specifies the positions of the data fields 164 in the application card 124. The card server 200 determines (e.g., identifies) a template 224 based on the card request 170. Upon identifying a relevant template 224, the card server 200 instantiates a data container that represents the unparameterized card object 270u. The card server 200 writes information from the selected template 224 to the unparameterized card object 270u. For example, the card server 200 may write the template ID 226 to the unparameterized card object 270u. Alternatively, the card server 200 may write the field IDs 166 that identify the data fields 164 and the layout 234 to the unparameterized card object 270u. The template data store may include one or more databases, indices (e.g., inverted indices), tables, Look-Up Tables (LUT), files and/or other data structures. For example, the template data store may include an inverted index that indexes the field IDs 166 to the template ID 226. Additionally or alternatively, the template data store may include an inverted index that indexes the SAMs 26 or the WAMs 36 to the template IDs 226.

The search server 150 receives the unparameterized card object 270u from the card server 200. Upon receiving the unparameterized card object 270u, the search server 150 parameterizes the unparameterized card object 270u to form a parameterized card object 270p. The search server 150 parameterizes the unparameterized card object 270u by assigning (e.g., populating) the field values 168 from the record 160 to the data fields 164 in the unparameterized card object 270u. The search server 150 transmits the parameterized card object 270p to the mobile computing device 120. The mobile computing device 120 receives the parameterized card object 270p and uses the parameterized card object 270p the display the application cards 124. In some examples, the mobile computing device 120 can receive the parameterized card object 270p directly from the card server 200, for example, when the card request 170 includes the field values 168 from the record 160.

Figure 2A:
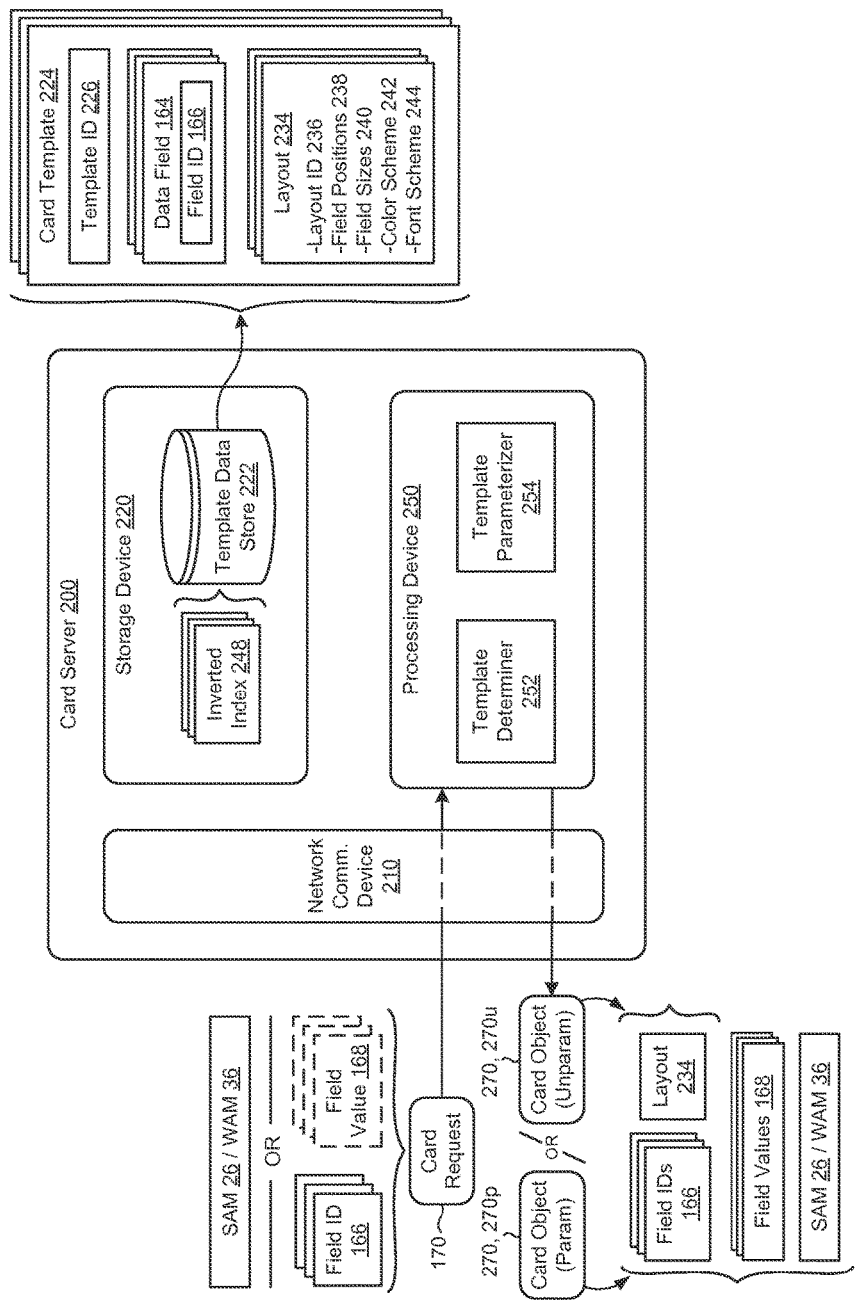
FIG. 2A is a block diagram of a card server that determines card templates for application cards.

FIG. 2A illustrates an example block diagram for the card server 200. The card server 200 may be implemented by a cloud computing platform. The cloud computing platform may include a collection of remote computing services. The cloud computing platform may include computing resources (e.g., processing device 250). The computing resources may include physical servers that have physical central processing units (pCPUs). The cloud computing resources may include storage resources (e.g., storage device 220). The storage resources may include database servers that support NoSQL, MySQL, Oracle, SQL Server, or the like. The cloud computing platform may include networking resources (e.g., network communication device 210). For example, the networking resources may distribute incoming requests for event notifications across multiple virtual private servers. Example cloud computing platforms include Amazon Web Services®, and Google Cloud Platform®.

The network communication device 210 communicates with a network (e.g., the network shown in FIG. 1). The network communication device 210 may include a communication interface that performs wired communication (e.g., via Ethernet, Universal Serial Bus (USB) or fiber-optic cables). The network communication device 210 may perform wireless communication (e.g., via Wi-Fi, a cellular network, or satellites). The network communication device 210 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 220 stores data. The storage device 220 may include one or more computer readable storage mediums. For example, the storage device 220 may include solid state memory devices, hard disk memory devices, optical disk drives, read-only memory and/or nanotube-based storage devices. The storage device 220 may be connected to the processing device 250 via a bus and/or a network. Different storage mediums within the storage device 220 may be located at the same physical location (e.g., in the same data center, same rack, or same housing). Different storage mediums of the storage device 220 may be distributed (e.g., in different data centers, different racks, or different housings). The storage device 220 may implement (e.g., store) a template data store 222.

The template data store 222 stores card templates 224. A card template 22 may include a template ID 226 that identifies the card template 224. A card template 224 may include various data fields 164. Each data field 164 may be associated with a field ID 166 that identifies the data field 164. The card template 224 may also include a layout 234 that specifies the visual characteristics of the card template 224. The layout 234 may include a layout ID 236 that identifies the layout 234. The layout 234 may specify field positions 238 for the data fields 164. The layout 234 may specify field sizes 240 for the data fields 164. The layout 234 may specify a color scheme 242 (e.g., a background color) for the card template 224. The layout 234 may specify a font scheme 244 (e.g., font styles, font sizes, font colors, etc.) for the card template 224. A card template 224 may also include one or more actionable graphical user interface (GUI) elements (e.g., a button) that enable a user to perform an action (e.g., buy tickets, watch videos, etc.).

The template data store 222 may include one or more databases, indices (e.g., inverted indices), tables, Look-Up Tables (LUT), files, and/or other data structures. For example, the template data store 222 may include inverted indices 248. In some implementations, an inverted index 248 indexes the field IDs 166 to the template IDs 226. Another inverted index 248 may index the SAMs 26 (e.g., state IDs of native applications) to the template IDs 226. Similarly, another inverted index 248 may index the WAMs 36 (e.g., web URLs) to the template IDs 226.

The processing device 250 may include a collection of one or more computing processors that execute computer readable instructions. The computing processors of the processing device 250 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 250 executes a template determiner 252. The processing device 250 may also execute a template parameterizer 254. The processing device 250 may execute the template determiner 252 and the template parameterizer 254 by executing computer-readable instructions corresponding therewith.

The template determiner 252 determines a card template 224 based on the card request 170. The template determiner 252 can use various different techniques to determine the card template 224 based on the information included in the card request 170. In some implementations, the card request 170 includes the field IDs 166. In such implementations, the template determiner 252 can determine the card template 224 by comparing the field IDs 166 indicated in the card request 170 with the field IDs 166 of the card templates 224. For example, the template determiner 252 may utilize an inverted index 248 that indexes the field IDs 166 to the template IDs 226. Specifically, the template determiner 252 can query the inverted index 248 with the field IDs 166 specified in the card request 170. In response to querying the inverted index 248, the template determiner 252 may receive a template ID 226 for a template 224 that corresponds with the field IDs 166 specified in the card request 170. Upon receiving the template ID 226, the template determiner 252 can retrieve the corresponding card template 224 from the template data store 222.

In some implementations, the card request 170 includes information that indicates a particular state of a native application. For example, the card request 170 may include a SAM 26. The template determiner 252 can identify the state referenced by the SAM 26 by parsing the SAM 26. For example, the template determiner 252 may identify a state ID that is included in the SAM 26. The card templates 224 may be associated with states of native applications. For example, an inverted index 248 may index state IDs to the template IDs 226. The template determiner 252 can query the inverted index 248 with the state ID specified in the SAM 26. In response to querying the inverted index 248, the template determiner 252 may receive a template ID 226. Upon receiving the template ID 226, the template determiner 252 can retrieve the corresponding card template 224.

Similarly, in some implementations, the card request 170 includes information that indicates a particular state of a web application. For example, the card request 170 may include a WAM 36. The template determiner 252 can identify the state referenced by the WAM 36 by parsing the WAM 36. For example, the template determiner 252 may identify a web URL that is included in the WAM 36. The card templates 224 may be associated with states of web applications. For example, an inverted index 248 may index web URLs to the template IDs 226. The template determiner 252 can query the inverted index 248 with the web URL specified in the WAM 36. In response to querying the inverted index 248, the template determiner 252 may receive a template ID 226. The template ID 226 may be an alphanumeric string that identifies a card template 224. Upon receiving the template ID 226, the template determiner 252 can retrieve the corresponding card template 224.

Some webpages indicate some of their content by tagging the content with metatags in accordance with a schema vocabulary. Metatags that comply with a schema vocabulary may be referred to as schema tags. Example schema vocabularies include schema.org and Facebook Open Graph by Facebook, Inc. For example, a webpage that displays information about a movie may include one or more of the following tags:

| Content | Example Metatags |
|---|---|
| Movie | <div...itemscope itemtype="http://schema.org/Movie"> |
| Movie name | ...itemprop="name"> |
| Description | ...itemprop="description"> |
| Director | ...itemprop="director" itemscope itemtype="http://schema.org/Person" |
| Actor(s) | ...itemprop="actor" itemscope itemtype="http://schema.org/Person"> |
| Movie Rating | ...itemprop="aggregateRating" ..."http://schema.org/AggregateRating" |
| Trailer | ...itemprop="tralier"> |

The template determiner 252 can use the WAM 36 to access the HTML code of a webpage. The template determiner 252 can identify schema tags specified in the HTML code of the webpage, for example, by comparing the metatags with schema vocabularies. By identifying the schema tags, the template determiner 252 can determine the data fields 164 that the webpage displays. Upon identifying the data fields 164 displayed by the webpage, the template determiner 252 can identify a card template 224 that includes the data fields 164 displayed by the webpage.

Some webpages may not tag their content with schema tags. In such scenarios, the template determiner 252 can identify generic HTML tags, such as image tags (e.g., <img>), video tags (e.g., <video>, <embed>, etc.) and tags that typically include long pieces of text. As used herein, a long piece of text may refer to a text that includes more than the threshold number of words (e.g., more than 8 words). Upon identifying an image tag and a tag that includes a long piece of text, the template determiner 252 can retrieve a card template 224 that includes an image data field 164 and a text data field 164. Similarly, upon identifying a video tag and a tag that includes a long piece of text, the template determiner 252 can retrieve a card template 224 that includes a video data field 164 and a text data field 164.

In some implementations, determining a card template 224 includes scoring the card templates 224. The template determiner 252 may use a scoring model to score the card templates 224. The scoring model may use various scoring features to score each card template 224. In some examples, a scoring feature is the number of data fields 164 that can be populated based on the information in the card request 170. The template determiner 252 can filter out a card template 224, if less than a threshold percentage of the data fields 164 can be populated based on the information in the card request 170. For example, if only fifty percent of the data fields 164 of a particular card template 224 can be populated based on the card request 170, then the template determiner 252 may filter out that particular card template 224. If, for a particular card template 224, the number of data fields 164 that can be populated based on the information in the card request 170 is greater than a threshold percentage, then the template determiner 252 may select that particular card template 224. For example, if all the data fields 164 of a card template 224 can be populated based on the information in the card request 170, then the template determiner 252 may select the card template 224. Also, the scoring model may assign a higher weight to certain data fields 164. For example, the scoring model may assign a higher weight to a data field 164 for a title than a data field 164 for a data of birth.

Upon determining a card template 224, the template determiner 252 can instantiate a data container that represents a card object 270. If the card request 170 does not include the field values 168, the template determiner 252 generates an unparameterized card object 270u. The unparameterized card object 270u includes the field IDs 166 and the layout 234 from the selected card template 224. If the card request 170 does include the field values 168, the template determiner 252 generates a parameterized card object 270p. The parameterized card object 270p includes the field values 168 in addition to including the field IDs 166 and the layout 234. The parameterized card object 270p may also include the SAM 26 or the WAM 36. The card server 200 transmits the card object 270 via the network communication device 210. The card server 200 can transmit the unparameterized card object 270u to the search server 150 shown in FIG. 1. The card server 200 can transmit the parameterized card object 270p to the search server 150 and/or the mobile computing device 120 shown in FIG. 1.

Figure 2B:
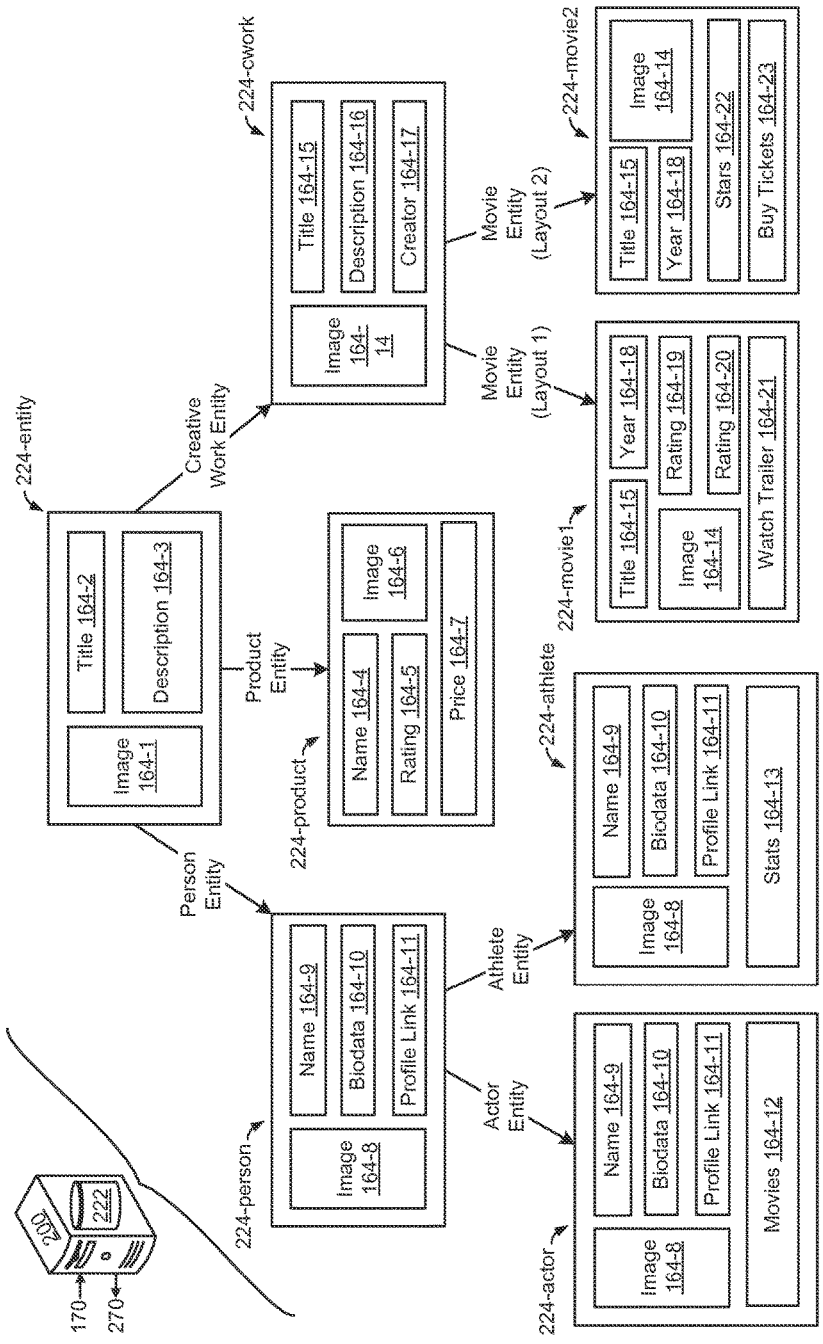
FIG. 2B is a schematic diagram that illustrates a hierarchy of the card templates.

FIG. 2B is a schematic diagram that illustrates example card templates 224 (see Appendix A for additional examples). The card templates 224 may collectively form a hierarchy that may correspond with an ontology. In the example of FIG. 2B, there are three hierarchical levels of card templates. Each level in the hierarchy may correspond with a different ontological level. For example, the card template 224-entity may be at the top of the hierarchy (e.g., at level 1). The card template 224-entity can be used to display basic information regarding any entity. For example, the card template 224-entity may display an image 164-1, a title 164-2 and a description 164-3 for the entity. An entity may refer to any physical or logical object, item or activity. An entity can have one or more entity types. The template data store 222 may include additional card templates 224 that can be used to display information about specific entity types. For example, a card template 224-person can be used to display information about a person entity. The following table illustrates different card templates 224 that can be used to display information about different entity types.

| Entity Type | Card Template 224 | Data fields 164 |
|---|---|---|
| Person | Card template 224-person | Person Image 164-8<br>Person Name 164-9<br>Person Biodata 164-10<br>Profile Link 164-11 |
| Person >> Actor | Card template 224-actor | . . .<br>Movies 164-12 |
| Person >> Athlete | Card template 224-athlete | . . .<br>Stats 164-13 |
| Product | Card template 224-product | Product Name 164-4<br>Product Rating 164-5<br>Product Image 164-6<br>Price 164-7 |
| Creative Work | Card template 224-cwork | Image 164-14<br>Title 164-15<br>Description 164-16<br>Creator 164-17 |
| Creative Work >> Movie | Card template 224-movie1 | . . .<br>Year 164-18<br>Critics Rating 164-19<br>User Rating 164-20<br>Movie Trailer 164-21 |
| | Card template 224-movie2 | . . .<br>Year 164-18<br>Movie Stars 164-22<br>Movie Tickets 164-23 |

In some examples, the card request 170 indicates that the information that ought to be displayed on the mobile computing device relates to a particular type of entity. For example, the card request 170 may indicate that the information that ought to be displayed relates to a person. In this example, the card server 200 can select the card template 224-person and send the card template 224-person via the card object 270. The card server 200 may further determine that the person is an actor. Upon determining that the information that ought to be displayed relates to an actor entity, the card server 200 can select the card template 224-actor. Similarly, the card server 200 may select the card template 224-athlete, if the information that ought to be displayed relates to an athlete.

Some entity types may be associated with multiple card templates 224. For example, the card server 200 can select either the card template 224-movie1 or the card template 224-movie2 to display information regarding a movie entity. In the example of FIG. 2B, the card templates 224-movie1, 224-movie2 include different data fields 164. However, the card templates 224-movie1, 224-movie2 could include the same data fields 164 but the data fields 164 could be sized or positioned differently. Card templates 224 that are associated with the same entity type may be associated with different applications. For example, the card template 224-movie1 can be associated with an application that displays ratings for movies, whereas the card template 224-movie2 could be associated with an application that enables a user to purchase tickets for movies. In this example, the card server 200 can select the card template 224-movie2, if the card request 170 indicates that the information that ought to be displayed is from the application that enables movie ticket purchases. Similarly, the card server 200 can select the card template 224-movie1, if the card request 170 indicates that the information that ought to be displayed is from the application that displays movie ratings.

In some implementations, the card request 170 indicates that the information that is to be displayed relates to a particular entity type. However, the card server 200 may determine that the card request 170 does not include enough information to parameterize the card template 224 that corresponds with the entity type. In such scenarios, the card server 200 may select a card template 224 that is one or more levels higher in the hierarchy of card templates 224. For example, the card request 170 may indicate that the information that is to be displayed relates to a movie. Although the template data store 222 includes the card templates 224-movie1, 224-movie2 that can be used to display information regarding a movie, the card server 200 may instead select the card template 224-cwork for creative works. The card server 200 may select the card template 224-cwork upon determining that the card request 170 does not include enough information to parameterize the card templates 224-movie1, 224-movie2. However, there may be enough information in the card request 170 to parameterize the card template 224-cwork.

In some implementations, the card server 200 initially selects a card template 224 that is at the top of the hierarchy. For example, the card server 200 may select the card template 224-entity that can be used to display information regarding any entity. After selecting the card template 224-entity, the card server 200 can traverse lower levels of the hierarchy to identify a suitable card template with additional data fields 164. For example, the card server 200 can traverse the second level of the hierarchy illustrated in FIG. 2B and determine whether the card templates 224-person, 224-product and 224-cwork are suitable. If the information that is to be displayed relates to a person, then the card server 200 may replace its initial selection of the card template 224-entity with the card template 224-person because the card template 224-person can display more information regarding a person. Similarly, the card server 200 can traverse additional levels of the hierarchy to identify a card template with additional data fields 164. For example, after selecting the card template 224-person to display information regarding a person, the card server 200 may traverse the third level of the hierarchy to determine whether the card server 200 can use the card templates 224-actor, 224-athlete. If the card server 200 determines that the person is an actor, the card server 200 can select the card template 224-actor because the card template 224-actor can display more information about actors than the card template 224-person.

Figure 3:
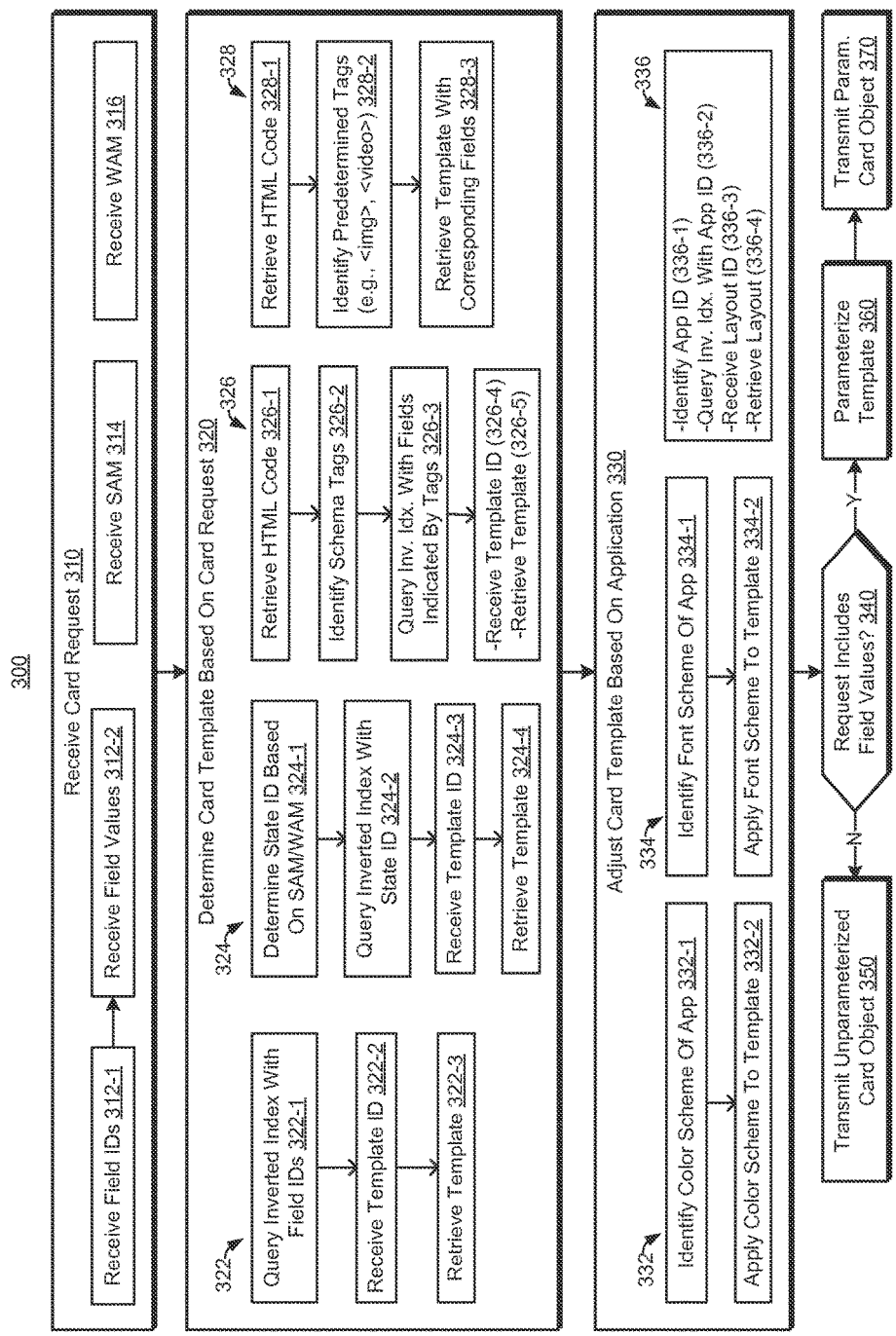
FIG. 3 is a block diagram that illustrates an example method that can be executed by the card server to determine a card template for an application card.

FIG. 3 is a block diagram of an example method 300 that may be executed by a server (e.g., card server 200 shown in FIG. 2A). The method 300 may be implemented as a set of computer-readable instructions that are executed by a computing processor (e.g., processing device 250 shown in FIG. 2A). Generally, the card server receives a card request (at 310). Upon receiving the card request, the card server determines a card template (at 320) and can transmit the card template as an unparameterized card object (at 350). In some implementations, the card server can parameterize the template (at 360) and transmit a parameterized card object (at 370). In some implementations, the card server adjusts the card template based on an application indicated in the card request (at 330).

Referring to 310, the card server receives a card request. The card server may receive the card request from a search server that determines search results in response to receiving a search query from a mobile computing device. The card request can include a variety of information. In some implementations, the card request includes field IDs for data fields that the search server identified in response to the search query (at 312-1). For example, the field IDs may identify a movie title field, a movie description field, a movie poster field, a movie stars field, etc. In addition to the field IDs, the card request may also include field values for the data fields corresponding with the field IDs (at 312-2). For example, the field values may include values for the movie title field, the movie description field, the movie poster field, the movie stars field, etc.

In some implementations, the card request includes a state access mechanism for a native application (at 314). The state access mechanism may include a string that refers to a particular state of the native application. For example, the state access mechanism may include a state ID or an application resource identifier (ARI). The state access mechanism can also provide access to the state being referred to. For example, the state access mechanism may include a URL that launches the native application into the referenced state. Alternatively, the state access mechanism may include a script that launches the native application into the referenced state.

In some implementations, the card request includes a web access mechanism for a web application (at 316). The web access mechanism may include a string that refers to a particular state of a web application. For example, the web access mechanism may include a state ID or a web resource identifier (WRI). The web access mechanism can also provide access to the state that refers to. For example, the web access mechanism may include a web URL that launches the web application (e.g., webpage) into the state referenced by the web URL. Alternatively, the web access mechanism may include a script that launches the web application into the referenced state.

Referring to 320, the card server determines a card template based on the card request. The card server may use a variety of techniques to determine the card template. The techniques that the card server employs to determine the card template may vary based on the information included in the card request. For example, if the card request includes field IDs, the card server may determine the card template by performing the operations indicated by 322. Similarly, if the card request includes a state access mechanism for a native application, the card server may determine the card template by performing the operations indicated by 324. Furthermore, if the card request includes a web access mechanism for a web application, the card server may determine the card template for performing the operations indicated by 324, 326 or 328.

Referring to 322, the card server may perform the operations indicated by 322 if the card request includes field IDs. The card server may include a template data store that stores card templates. Each card template may be associated with a template ID that identifies the card template. A card template may include various data fields. Each data field in the card template may be associated with a field ID that identifies the data field. The template data store may include an inverted index that indexes the field IDs to template IDs. At 322-1, a processing device of the card server can query the inverted index with the field IDs specified in the card request. Upon querying the inverted index, the processing device may receive a template ID that identifies a card template (at 322-2). Upon receiving the template ID, the processing device can retrieve the corresponding card template from the template data store (at 322-3).

Referring to 324, the card server may perform the operations indicated by 324 if the card request includes a state access mechanism for a native application or a web access mechanism for a web application. The card templates in the template data store may be associated with state IDs of native applications or web applications. Furthermore, the template data store may include an inverted index that indexes the state IDs to template IDs of the card templates. The card server may determine a state ID that identifies a state of the native application based on the state access mechanism for the native application (at 324-1). The card server may determine the state ID by parsing the state access mechanism to identify a substring with a defined format. Similarly, the card server may determine a state ID that identifies a state of a web application based on the web access mechanism for the web application. At 324-2, the processing device of the card server may query an inverted index with the state ID determined at 324-1. In response to querying the inverted index, the processing device may receive a template ID that identifies a card template corresponding with the state ID (at 324-3). Upon receiving the template ID, the processing device can retrieve the corresponding template from the template data store (at 324-4).

Referring to 326, the card server may perform the operations indicated by 326 if the card request includes a web access mechanism for a web application (e.g., a web URL for a webpage). Specifically, the card server may perform the operations indicated by 326 if the web application includes structured data. Structured data may refer to data that is tagged in accordance with a schema vocabulary. For example, a webpage that displays information about a movie may include one or more of the following tags:

| Content | Example Schema Tags |
|---|---|
| Movie | <div...itemscope itemtype="http://schema.org/Movie"> |
| Movie name | ...itemprop="name"> |
| Description | ...itemprop="description"> |
| Director | ...itemprop="director" itemseope itemtype="http://schema.org/Person" |

-continued

| Content | Example Schema Tags |
|---|---|
| Actor(s) | ...itemprop="actor" itemscope itemtype="http://schema.org/Person"> |
| Movie Rating | ...itemprop="aggregateRating" ..."http://schema.org/AggregateRating" |
| Trailer | ...itemprop="trailer"> |

At 326-1, the card server uses the web access mechanism to retrieve HTML code for the web application. The card server may retrieve the HTML code by querying a web server that hosts the web application. Upon retrieving the HTML code, the card server can identify schema tags within the HTML code (at 326-2). The card server may identify the schema tags by comparing the metatags in the HTML code with a vocabulary that corresponds with a schema (e.g., schema.org, twitter cards, Facebook open graph, etc.). The schema tags can indicate data fields that the web application displays. The processing device of the card server can query an inverted index with the field IDs of the data fields indicated by the schema tags (at 326-3). The inverted index may index the field IDs to template IDs of card templates store in the template data store. In response to querying the inverted index, the processing device can receive a template ID that identifies a card template (at 326-4). The processing device can retrieve the card template from the template data store (at 326-5).

Referring to 328, the card server may perform the operations indicated by 328 if the card request includes a web access mechanism for a web application (e.g., a web URL for a webpage). The card server may perform the operations indicated by 328 if the web application displays unstructured data. Unstructured data may refer to data that is not tagged in accordance with a schema vocabulary. At 328-1, the card server retrieves HTML code for the web application. The card server can retrieve the HTML code by querying a web server that hosts the web application. At 328-2, the card server identifies a set of predetermined tags in the HTML code. For example, the card server may identify tags that are typically used to indicate an image (e.g., an <img> tag), a video (e.g., a <video> tag or an <embed> tag) or long pieces of text (e.g., text that is longer than a threshold number of words, for example, longer than eight words). At 328-3, upon identifying the set of predetermined tags, the processing device of the card server can retrieve a card template that can display the data fields indicated by the predetermined tags. For example, the processing device may retrieve the card template 224-entity shown in FIG. 2B. In some implementations, the card server executes computer-readable instructions that enable the card server to scrape content from an unstructured web page (e.g., a web page that does not appear to use a schema, such as schema.org) into a structured schema (e.g., a schema similar to schema.org).

In some implementations, the card server can adjust the card template (at 330) once the card server has determined the card template (at 320). A card template may include one or more card settings and adjusting the card template may refer to adjusting one or more of the card settings. Example card settings include a color scheme (e.g., a background color), a font scheme (e.g., a font style, a font color, etc.), a card layout (e.g., position and size of data fields), etc. In some examples, the card server adjusts the template by applying a color scheme to the card template (at 332), by applying a font scheme to the card template (at 334) or by adjusting a layout of the card template (at 336). The card server may adjust the card template if the card request indicates an application (e.g., if the card request includes a state access mechanism for a native application or a web access mechanism for a web application). Different applications may be associated with different card settings. If the card request indicates a particular application, the card server can retrieve the card settings that correspond with that particular application and apply the card settings to the card template.

Referring to 332, the card server may identify a color scheme of an application indicated in the card request (at 332-1). The card server can identify the color scheme by identifying a background color used by the application. Alternatively or additionally, the card server can identify the color scheme by identifying a dominant color used by the application. The dominant color may refer to a color that is used more frequently than other colors. For example, if an application uses red more often than other colors then the card server may identify red as being the dominant color. As an alternative to identifying the color scheme itself, the card server can retrieve the color scheme from an external source. For example, the card server can retrieve the color scheme used by a web application by querying a web server that hosts the web application. Similarly, the card server can retrieve the color scheme used by a native application by querying an application server that stores information about the native application.

At 332-2, the card server applies the color scheme identified at 332-1 to the card template determined at 320. The card server can apply the color scheme to the card template by modifying a background color of the card template. The card server may modify the background color of the card template so that the background color of the card template is the same as the dominant color indicated by the color scheme. In some implementations, instead of modifying the entire background color, the card server modifies a portion of the background color. For example, the card server may place a horizontal ribbon towards the top of the card template or towards the bottom of the card template. In this example, the card server may color the ribbon so that the color of the ribbon matches the dominant color indicated by the color scheme.

Referring to 334, the card server may identify a font scheme of the application indicated in the card request (at 334-1). The card server can identify the font scheme by identifying a font that the application uses most frequently. For example, the application may use a variety of fonts to display information but the application may use Helvetica more frequently than any other font. In this example, the card server may identify Helvetica as the dominant font of the application. As an alternative to identifying the font scheme itself, the card server can query an external source to identify the font scheme. For example, the card server can query a web server that hosts a web application to determine the font scheme of the web application. Similarly, the card server can query an application server that stores information about native applications to determine the font scheme of the native application. Identifying the font scheme may refer to identifying a font size, a font type and/or a font color.

At 334-2, the card server applies the font scheme identified at 334-1 to the card template determined at 320. The card server can apply the font scheme to the card template by associating the data fields in the card template with the dominant font indicated by the font scheme. In some examples, the card server can associate the dominant font with all data fields of the card template. In some examples, the card server associates the dominant font with some of the data fields but not all data fields (e.g., only with the data field that displays a title). In some implementations, the card server can associate different data fields with different fonts. For example, the card server may associate a data field that displays a title with a font that is used the display a title in the application. In this example, the card server may associate the other data fields of the card template with a font that is used to display other information in the application.

Referring to 336, the card server may adjust a layout of the card template based on the application indicated in the card request. Some card templates may have numerous layouts. The layouts may display the same data fields but the positions of the data fields may be different. The layouts may be associated with different applications and the template data store may include an inverted index that indexes application IDs to layout IDs that identify the layouts. At 336-1, the card server identifies an application ID specified in the card request. For example, the card server may parse a state access mechanism for a native application to identify an application ID that identifies the native application. Similarly, the card server may parse a web access mechanism for a web application to identify an application ID that identifies the web application. At 336-2, the processing device of the card server queries an inverted index that indexes application IDs to layout IDs. Upon querying the inverted index, the processing device may receive a layout ID that identifies a layout (at 336-3). In response to receiving the layout ID, the processing device can retrieve the corresponding layout from the template data store (at 336-4).

At 340, the card server can determine whether the card request includes field values (i.e., the information that ought to be displayed in response to the search query). Upon determining that the card request does not include field values, the card server can transmit an unparameterized card object (at 350). Transmitting the unparameterized card object may include instantiating a data container and writing information about the card template determined at 320 to the data container. Writing information about the card template may include writing the field IDs for the data fields in the card template and writing information that indicates the layout of the data fields. The card server can transmit the unparameterized card object to the same network entity that sent the card request to the card server. For example, the card server can transmit the unparameterized card object to the search server 150 shown in FIG. 1.

If, at 340, the card server determines that the card request includes the field values, the card server can parameterize the card template (at 360). Parameterizing the card template may refer to populating (e.g., filling-in) the data fields in the card template with the field values indicated in the card request. Upon parameterizing card template, the card server can transmit a parameterized card object (at 370). The parameterized card object may be similar to the unparameterized card object in many respects. However, unlike the unparameterized card object, the parameterized card object includes the field values. The card server may transmit the parameterized card object to the same network entity that sent the card request to the card server (e.g., search server 150 shown in FIG. 1). Alternatively, the card server can transmit the parameterized card object directly to the mobile computing device that initiated the search query (e.g., mobile computing device 120 shown in FIG. 1).

An application (e.g., native application 22 and/or the web application 32 shown in FIG. 1) may refer to computer software that causes a computing device to perform a task. In some examples, a software application is referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

A non-transitory memory (e.g., the storage devices 156, 220 shown in FIG. 1) may refer to physical devices that are used to store programs (e.g., sequences of instructions) or data (e.g., program state information) on a temporary or permanent basis for use by a computing device (e.g., the processing device 154, 250 shown in FIG. 1). The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
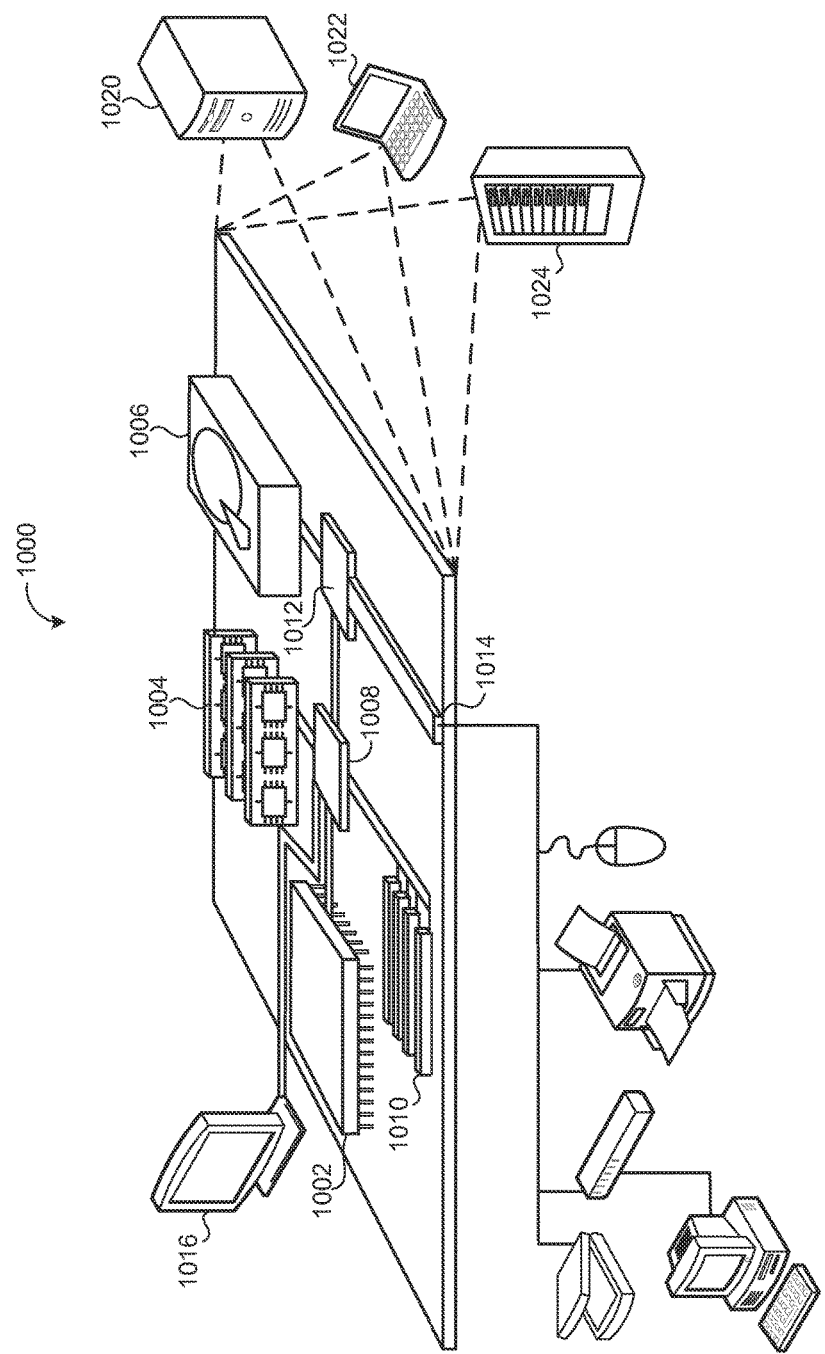
FIG. 4 is a block diagram of an example computing device that may be used to implement the mobile computing device, the application server, the web server, the search server and/or the card server shown in FIG. 1.

FIG. 4 is a block diagram of an example computing devices 1000 that may be used to implement the systems and methods described in this document. For example, the computing devices 1000 may be used to implement the application server 20, the web server 30, the mobile computing device 120, the search server 150 and/or the card server 200 shown in FIG. 1. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In some implementations, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer-or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In some implementations, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer, such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The card templates may be arranged in the following hierarchy:

Thing (Entity)
   Creative Work
   Movie
   Song
   Album
   Painting
   Picture
   Event
   Organization
   Person
   Actor
   Athlete
   Politician
   Place
   Product Level 1 Card Templates Entity A card template for an entity (e.g., thing) may include one or more of the following data fields:
   name: The name of the item.
   image: An image of the item. This can be a URL or a fully described ImageObject.
   description: A short description of the item.
   alternateName (subtitle): An alias for the item.
   sameAs: URL of a reference Web page that unambiguously indicates the item's identity. E.g. the URL of the item's Wikipedia page. Freebase page, or official website.

Level 2 Card Templates

Place

A card template for a place entity (i.e., geographical location) may include one or more of the following data fields:
   address: (PostalAddress) Physical address of the item.
   aggregateRating: The overall rating, based on a collection of reviews or ratings, of the item.
   containedIn: The basic containment relation between places.
   event: Upcoming or past event associated with this place, organization, or action. Supersedes events.
   geo: The geo coordinates of the place.
   logo: An associated logo.
   OpeningHoursSpecification: The opening hours of a certain place.
   photo: A photograph of this place. Supersedes photos.
   review: A review of the item. Supersedes reviews.
   telephone: The telephone number.

Product

A card template for a product entity may include one or more of the following data fields:
   aggregateRating: The overall rating, based on a collection of reviews or ratings, of the item.
   brand: The brand(s) associated with a product or service, or the brand(s) maintained by an organization or business person.
   isRelatedTo: A pointer to another, somehow related product (or multiple products).
   isSimilarTo: A pointer to another, functionally similar product (or multiple products).
   itemCondition: A predefined value from OfferItemCondition or a textual description of the condition of the product or service, or the products or services included in the offer.
   logo: An associated logo.
   manufacturer: The manufacturer of the product.
   model: The model of the product. Use with the URL of a ProductModel or a textual representation of the model identifier. The URL of the ProductModel can be from an external source. It is recommended to additionally provide strong product identifiers via the gtin8/gtin13/gtin14 and mpn properties.
   offers: An offer to provide this item—for example, an offer to sell a product, rent the DVD of a movie, or give away tickets to an event.
   releaseDate: The release date of a product or product model. This can be used to distinguish the exact variant of a product.
   review: A review of the item. Supersedes reviews. A review of the item. Supersedes reviews.

Creative Work

A card template for a creative work entity may include one or more of the following data fields:
   about: The subject matter of the content.
   accountablePerson: Specifies the Person that is legally accountable for the CreativeWork.
   aggregateRating: The overall rating, based on a collection of reviews or ratings, of the item.
   alternativeHeadline: A secondary title of the CreativeWork.
   associatedMedia: A media object that encodes this CreativeWork. This property is a synonym for encoding.
   audience: The intended audience of the item, i.e. the group for whom the item was created.
   audio: An embedded audio object.
   author: The author of this content. Please note that author is special in that HTML 5 provides a special mechanism for indicating authorship via the rel tag. That is equivalent to this and may be used interchangeably.
   award: An award won by this person or for this creative work.
   character: Fictional person connected with a creative work.
   citation: A citation or reference to another creative work, such as another publication, web page, scholarly article, etc.

comment: Comments, typically from users, on this CreativeWork.

commentCount: The number of comments this CreativeWork (e.g. Article, Question or Answer) has received. This is most applicable to works published in Web sites with commenting system; additional comments may exist elsewhere.

contentLocation: The location of the content.

contentRating: Official rating of a piece of content—for example, 'MPAA PG-13'.

contributor: A secondary contributor to the CreativeWork.

copyrightHolder: The party holding the legal copyright to the CreativeWork.

copyrightYear: The year during which the claimed copyright for the CreativeWork was first asserted.

creator: The creator/author of this CreativeWork or UserComments. This is the same as the Author property for CreativeWork.

dateCreated: The date on which the CreativeWork was created.

dateModified: The date on which the CreativeWork was most recently modified.

datePublished: Date of first broadcast/publication.

editor: Specifies the Person who edited the CreativeWork.

genre: Genre of the creative work or group.

hasPart: Indicates a CreativeWork that is (in some sense) a part of this CreativeWork. (Inverse property: isPartOf.)

headline: Headline of the article.

isFamilyFriendly: Indicates whether this content is family friendly.

isPartOf: Indicates a CreativeWork that this CreativeWork is (in some sense) part of. (Inverse property: hasPart.)

keywords: Keywords or tags used to describe this content. Multiple entries in a keywords list are typically delimited by commas.

license: A license document that applies to this content, typically indicated by URL.

mentions: Indicates that the CreativeWork contains a reference to, but is not necessarily about a concept.

offers: An offer to provide this item—for example, an offer to sell a product, rent the DVD of a movie, or give away tickets to an event.

position: The position of an item in a series or sequence of items.

producer: The person or organization who produced the work (e.g. music album, movie, tv/radio series etc.).

provider: The service provider, service operator, or service performer; the goods producer. Another party (a seller) may offer those services or goods on behalf of the provider. A provider may also serve as the seller. Supersedes carrier.

publisher: The publisher of the creative work.

publishingPrinciples: Link to page describing the editorial principles of the organization primarily responsible for the creation of the CreativeWork.

recordedAt: The Event where the CreativeWork was recorded. The CreativeWork may capture all or part of the event. (Inverse property: recordedIn.)

releasedEvent: The place and time the release was issued, expressed as a PublicationEvent.

review: A review of the item. (Supersedes reviews.)

sourceOrganization: The Organization on whose behalf the creator was working.

text: The textual content of this CreativeWork.

thumbnailUrl: A thumbnail image relevant to the Thing.

timeRequired: Approximate or typical time it takes to work with or through this learning resource for the typical intended target audience, e.g. 'P30M', 'P1H25M'.

translator: Organization or person who adapts a creative work to different languages, regional differences and technical requirements of a target market.

typicalAgeRange: The typical expected age range, e.g. '7-9', '11-'.

version: The version of the CreativeWork embodied by a specified resource.

video: An embedded video object.

workExample: Example/instance/realization/derivation of the concept of this creative work. eg. The paperback edition, first edition, or eBook. (Inverse property: exampleOfWork.)

Person

A card template for a person entity may include one or more of the following data fields:

additionalName: An additional name for a Person, can be used for a middle name.

address: Physical address of the item.

affiliation: An organization that this person is affiliated with. For example, a school/university, a club, or a team.

award: An award won by this person or for this creative work. Supersedes awards.

birthDate: Date of birth.

birthPlace: The place where the person was born.

brand: The brand(s) associated with a product or service, or the brand(s) maintained by an organization or business person.

children: A child of the person.

contactPoint: A contact point for a person or organization. Supersedes contactPoints.

deathDate: Date of death.

deathPlace: The place where the person died.

duns: The Dun & Bradstreet DUNS number for identifying an organization or business person.

email: Email address.

familyName: Family name. In the U.S., the last name of an Person. This can be used along with givenName instead of the name property.

gender: Gender of the person.

givenName: Given name. In the U.S., the first name of a Person. This can be used along with familyName instead of the name property.

homeLocation: A contact location for a person's residence.

jobTitle: The job title of the person (for example, Financial Manager).

knows: The most generic bi-directional social/work relation.

makesOffer: A pointer to products or services offered by the organization or person.

memberOf: An Organization (or ProgramMembership) to which this Person or Organization belongs. (Inverse property: member.)

nationality: Nationality of the person.

netWorth: The total financial value of the organization or person as calculated by subtracting assets from liabilities.

owns: Products owned by the organization or person.

parent: A parent of this person. Supersedes parents.

performerIn: Event that this person is a performer or participant in.

relatedTo: The most generic familial relation.

seeks: A pointer to products or services sought by the organization or person (demand).

sibling: A sibling of the person. Supersedes siblings.

spouse: The person's spouse.

telephone: The telephone number.

Broadcast Service

A card template for a broadcast service may include one or more of the following data fields:

area: The area within which users can expect to reach the broadcast service.

broadcaster: The organization owning or operating the broadcast service.

parentService: A broadcast service to which the broadcast service may belong to, such as regional variations of a national channel.

Event

A card template for an event may include one or more of the following data fields:

attendee: A person or organization attending the event. Supersedes attendees.

doorTime: The time admission will commence.

duration: The duration of the item (movie, audio recording, event, etc.) in ISO 8601 date format.

endDate: The end date and time of the item (in ISO 8601 date format).

eventStatus: An eventStatus of an event represents its status; particularly useful when an event is cancelled or rescheduled.

location: The location of the event, organization or action.

offers: An offer to provide this item—for example, an offer to sell a product, rent the DVD of a movie, or give away tickets to an event.

organizer: An organizer of an Event.

performer: A performer at the event—for example, a presenter, musician, musical group or actor. Supersedes performers.

previousStartDate: Used in conjunction with eventStatus for rescheduled or cancelled events. This property contains the previously scheduled start date. For rescheduled events, the startDate property should be used for the newly scheduled start date. In the (rare) case of an event that has been postponed and rescheduled multiple times, this field may be repeated.

recordedIn: The CreativeWork that captured all or part of this Event. (Inverse property: recordedAt.)

startDate: The start date and time of the item (in ISO 8601 date format).

subEvent: An Event that is part of this event. For example, a conference event includes many presentations, each of which is a subEvent of the conference. Supersedes subEvents.

superEvent: An event that this event is a part of. For example, a collection of individual music performances might each have a music festival as their superEvent.

typicalAgeRange: The typical expected age range, e.g. '7-9', '11-'.

workPerformed: A work performed in some event, for example a play performed in a TheaterEvent.

Organization

A card template for an organizational entity may include one or more of the following data fields:

address: Physical address of the item.

aggregateRating: The overall rating, based on a collection of reviews or ratings, of the item.

brand: The brand(s) associated with a product or service, or the brand(s) maintained by an organization or business person.

contactPoint: A contact point for a person or organization. Supersedes contactPoints.

department: A relationship between an organization and a department of that organization, also described as an organization (allowing different urls, logos, opening hours). For example: a store with a pharmacy, or a bakery with a cafe.

dissolutionDate: The date that this organization was dissolved.

email: Email address.

employee: Someone working for this organization. Supersedes employees.

event: Upcoming or past event associated with this place, organization, or action. Supersedes events.

faxNumber: The fax number.

founder: A person who founded this organization. Supersedes founders.

foundingDate: The date that this organization was founded.

foundingLocation: The place where the Organization was founded.

interactionCount: A count of a specific user interactions with this item—for example, 20 UserLikes, 5 UserComments, or 300 UserDownloads. The user interaction type should be one of the sub types of UserInteraction.

legalName: The official name of the organization, e.g. the registered company name.

location: The location of the event, organization or action.

logo: An associated logo.

makesOffer: A pointer to products or services offered by the organization or person.

member: A member of an Organization or a ProgramMembership. Organizations can be members of organizations; ProgramMembership is typically for individuals. Supersedes members, musicGroupMember. (Inverse property: memberOf.)

memberOf: An Organization (or ProgramMembership) to which this Person or Organization belongs. (Inverse property: member.)

owns: Products owned by the organization or person.

review: A review of the item. Supersedes reviews.

seeks: A pointer to products or services sought by the organization or person (demand).

subOrganization: A relationship between two organizations where the first includes the second, e.g., as a subsidiary. See also: the more specific 'department' property.

telephone: The telephone number.

Level 3 Card Templates

The template data store may store additional card templates for the following types of entities. For example, upon determining that the search query relates to a place, the card server may determine the type of place (e.g., administrative area, local business, residence, etc.)

Place (Level 2 Card Template)
AdministrativeArea
CivicStructure
Landform
LandmarksOrHistoricalBuildings
LocalBusiness
Residence
TouristAttraction
Product (Level 2 Card Template)
Individual Product ProductModel
SomeProducts
Vehicle
Creative Work (Level 2 Card Template)
Answer
Article
Blog
Book
Clip
Code
Comment
DataCatalog
Dataset
Diet
EmailMessage
Episode
ExercisePlan
Game
Map
MediaObject
Movie
MusicComposition
MusicPlaylist
MusicRecording
Painting
Photograph
PublicationIssue
PublicationVolume
Question
Recipe
Review
Sculpture
Season
Series
SoftwareApplication
TVSeason
TVSeries
VisualArtwork
WebPage
WebPageElement
WebSite
Person (Level 2 Card Template)
Actor
Athlete
Character
Competitor
Composer
Director
Founder
Organization (Level 2 Card Template)
Airline
Corporation
EducationalOrganization
GovernmentOrganization
LocalBusiness
NGO
PerformingGroup
SportsOrganization
Event (Level 2 Card Template)
BusinessEvent
ChildrensEvent
ComedyEvent
DanceEvent
DeliveryEvent
EducationEvent
Festival
FoodEvent
LiteraryEvent
MusicEvent
PublicationEvent
SaleEvent
SocialEvent
SportsEvent
TheaterEvent
UserInteraction
VisualArtsEvent

What is claimed is:

1. A server comprising:
a communication interface;
a memory configured to store card templates for application cards, each card template being associated with one or more states of one or more applications, each card template comprising one or more data fields and a plurality of layouts that are each associated with different application IDs and that each indicate relative positions of the one or more data fields in the application card; and
a processor configured to execute computer-readable instructions that, when executed by the processor, cause the processor to:
receive a card request comprising information that indicates an application having an application ID and a particular state of the application;
identify the application and the particular state of the application indicated in the request;
query the memory for card templates corresponding to the application and the particular state of the application indicated in the request;
in response to the query, receive a card template corresponding to the particular state of the application indicated in the request;
determine a color scheme associated with the application indicated in the request;
apply the color scheme associated with the application to the card template;
identify a layout of the plurality of layouts for the card template based on the application ID;
apply the identified layout to the card template;
generate a data container that represents a card object comprising information regarding the card template; and
transmit the card object via the communication interface.

2. The server of claim 1, wherein:
the application comprises a native application that can be installed on a mobile computing device; and
the information in the card request comprises a state access mechanism, the state access mechanism comprises a string that refers to the native application and the particular state of the native application.

3. The server of claim 2, wherein:
identifying the application comprises parsing the string to identify an application ID that identifies the native application; and
identifying the particular state of the application comprises parsing the string to identify a state ID that identifies the particular state.

4. The server of claim 1, wherein querying the memory comprises querying an inverted index with a state ID that identifies the particular state of the application, wherein the inverted index maps state IDs to template IDs that correspond with the card templates stored in the memory.

5. The server of claim 4, wherein receiving the card template comprises:
   receiving a template ID that identifies the card template; and
   retrieving the card template from the memory.

6. The server of claim 1, wherein determining the color scheme associated with the application comprises determining a color that the application uses most frequently.

7. The server of claim 1, wherein applying the color scheme to the card template comprises changing a background color of the card template to a color that the application uses most frequently.

8. The server of claim 1, wherein generating the data container comprises writing information regarding the data fields of the card template and the layout of the data fields.

9. A server comprising:
   a communication interface;
   a memory configured to store card templates for application cards, each card template being associated with one or more web uniform resource locators (URLs), each card template comprising one or more data fields and a plurality of layouts that are each associated with different application IDs and that each indicate relative positions of the one or more data fields in the application card; and
   a processor configured to execute computer-readable instructions that, when executed by the processor, cause the processor to:
   receive a request for a card template, the request comprising a web access mechanism that provides access to a web application having an application ID;
   identify a web URL based on the web access mechanism;
   utilize the web URL to query the memory for card templates that correspond with the web application indicated in the request;
   in response to the query, receive a card template that corresponds with the web application indicated in the request;
   determine a font scheme associated with the web application indicated in the request;
   apply the font scheme associated with the web application to the card template;
   identify a layout of the plurality of layouts for the card template based on the application ID;
   apply the identified layout to the card template; and
   transmit the card template via the communication interface.

10. The server of claim 9, wherein querying the memory comprises querying an inverted index with the web URL specified in the request, wherein the inverted index indexes web URLs to template IDs that identify the card templates stored in the memory.

11. The server of claim 10, wherein receiving the card template comprises:
   receiving a template ID that identifies the card template; and
   retrieving the card template from the memory.

12. The server of claim 9, wherein determining the font scheme associated with the web application comprises determining a font that the web application uses most frequently to display information.

13. The server of claim 12, wherein applying the font scheme to the card template comprises associating the font with the data fields of the card template.

14. The server of claim 9, wherein transmitting the card template comprises:
   instantiating a data container that represents a card object; and
   writing information regarding the data fields of the card template and the layout of the data fields.

15. A computer-implemented method comprising:
   storing, by a processor, at memory, card templates for application cards, each card template comprising a template identifier (ID) that identifies the card template, one of more data fields, each data field comprising a field ID that identifies the data field, and a plurality of layouts that are each associated with different application IDs and that each indicate relative positions of the one or more data fields in the application card;
   receiving, by the processor, a request for a card template, the request comprising field IDs and an application ID via a communication interface;
   querying, by a processor, the template data store for card templates that correspond with the field IDs specified in the request;
   receiving, by the processor, a card template that corresponds with the field IDs specified in the request via the communication interface;
   identify a layout of the plurality of layouts for the card template based on the application ID;
   apply the identified layout to the card template;
   instantiating, by the processor, a data container that represents a card object;
   writing, by the processor, information regarding the data fields and the applied layout of the template to the card object; and
   transmitting the card object via the communication interface.

16. The computer-implemented method of claim 15, wherein querying the template data store comprises querying an inverted index with the field IDs specified in the request, wherein the inverted index indexes field IDs to the template IDs of the card templates stores in the memory.

17. The computer-implemented method of claim 16, wherein receiving the card template comprises:
   receiving a template ID that identifies the card template corresponding with the field IDs specified in the request; and
   retrieving the card template from the template data store.

18. The computer-implemented method of claim 15, wherein the request indicates an application ID that identifies a native application; and wherein the method further comprises modifying the card template based on the application ID specified in the request.

19. The computer-implemented method of claim 18, wherein modifying the card template comprises:
   determining a font scheme associated with the native application; and
   applying the font scheme to the card template.

20. The computer-implemented method of claim 18, wherein modifying the card template comprises:
   querying an inverted index with the application ID specified in the request, wherein the inverted index indexes the application IDs to layout IDs that identify different layouts of the card template;
   in response to the query, receiving a layout ID that identifies a layout corresponding with the application ID specified in the request; and
   retrieving the layout identified by the layout ID.

* * * * *